W. E. SYMONS.
AUTOMOBILE FENDER.
APPLICATION FILED MAY 15, 1911.
1,051,030.
Patented Jan. 21, 1913.
4 SHEETS—SHEET 1.
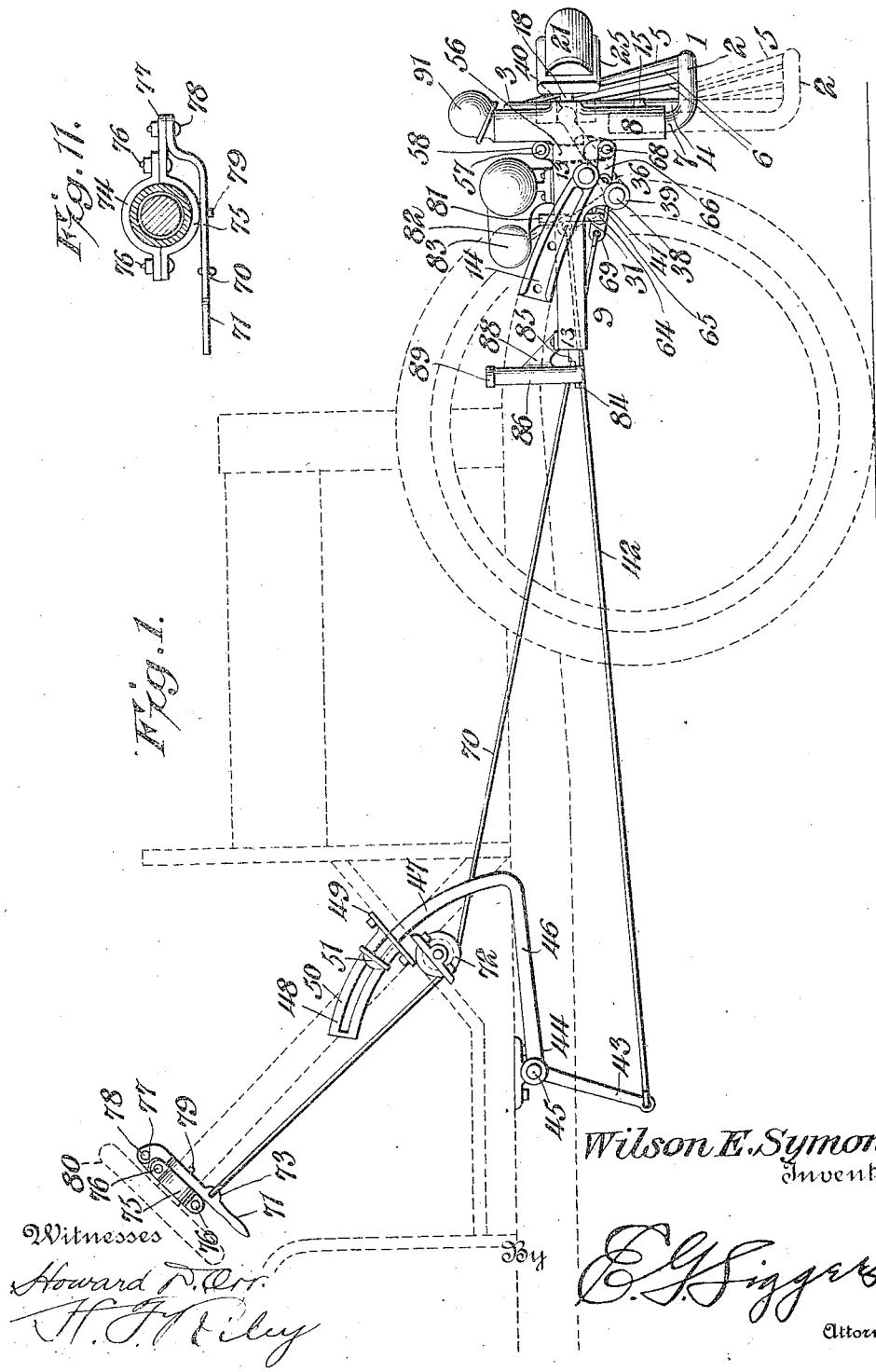
Wilson E. Symons,
Inventor,
Witnesses
Howard D. Orr.
H. J. Wiley
By E. G. Siggers
Attorney

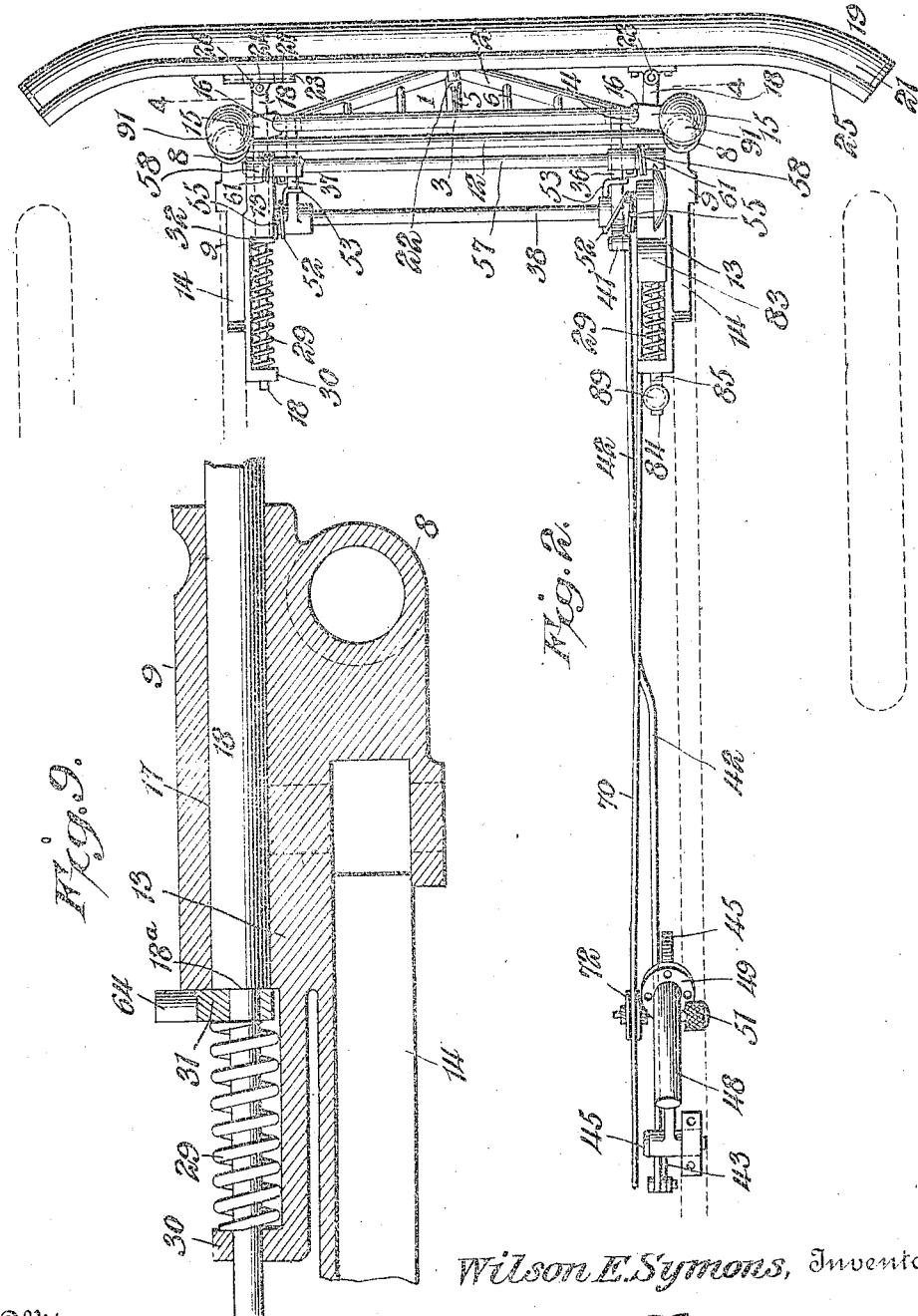

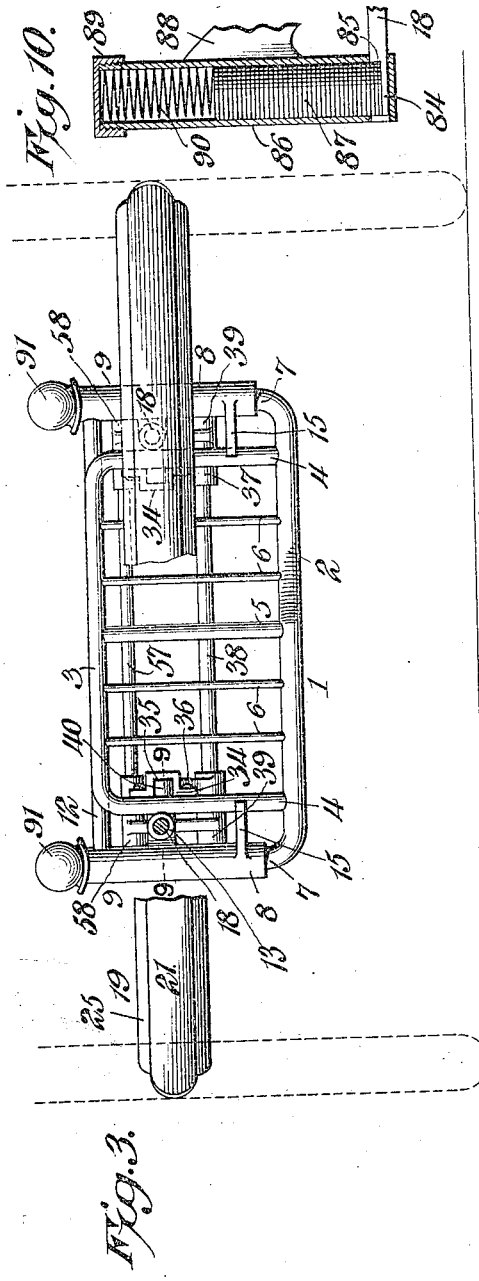
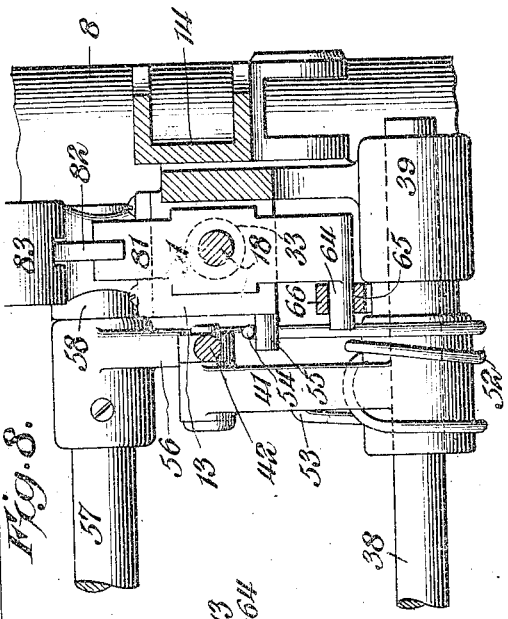
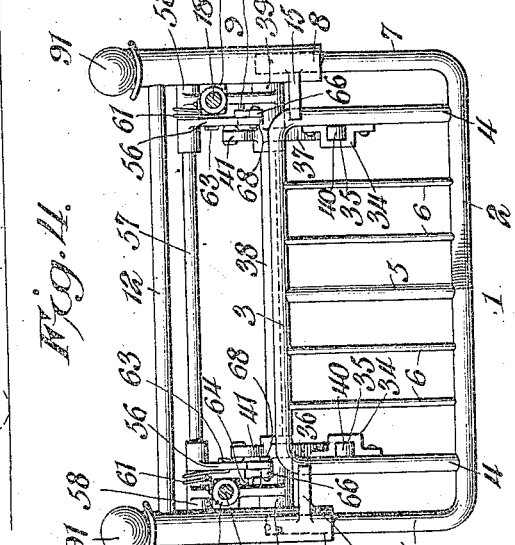

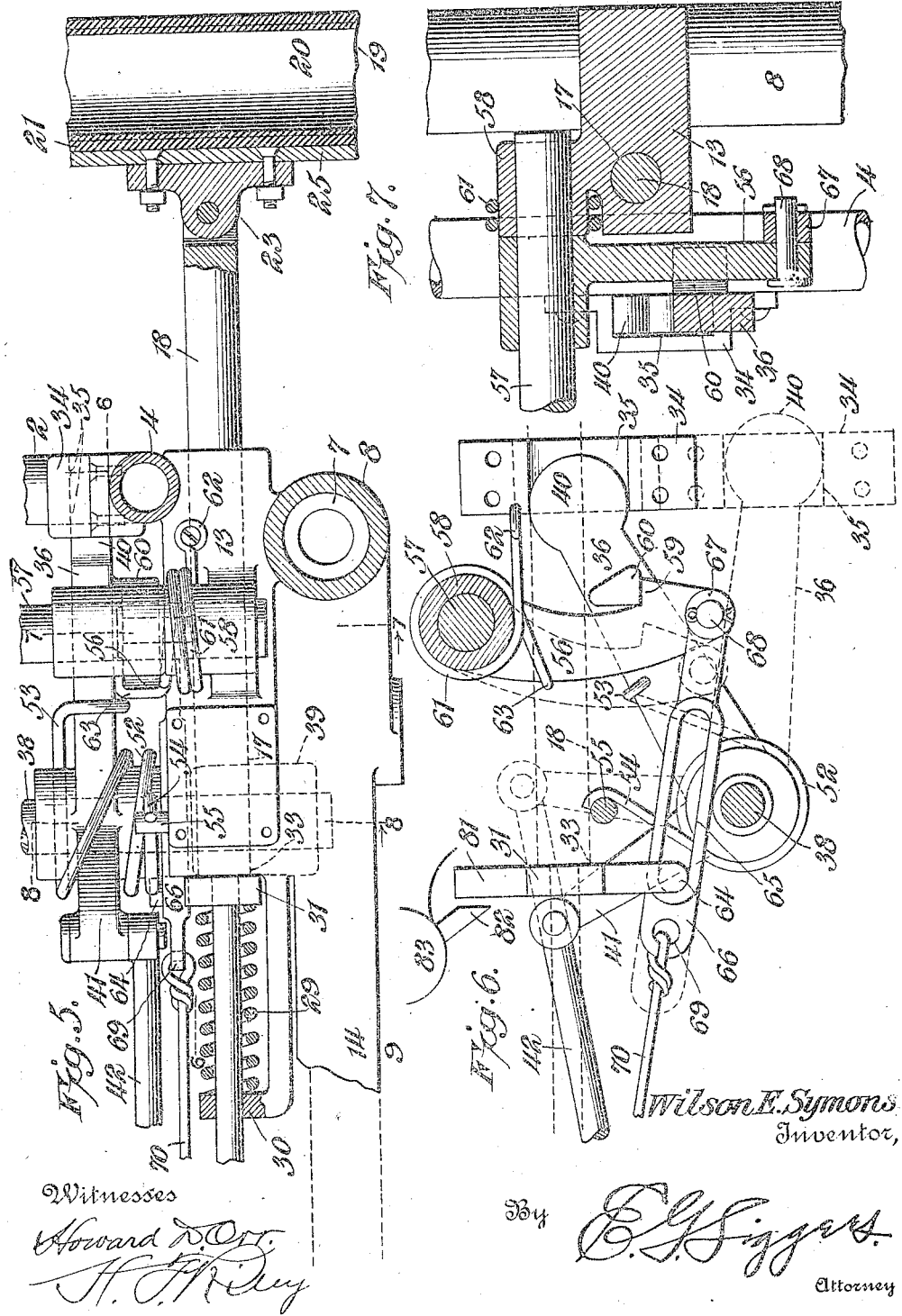

UNITED STATES PATENT OFFICE.

WILSON E. SYMONS, OF CHICAGO, ILLINOIS.

AUTOMOBILE-FENDER.

1,051,030. Specification of Letters Patent. Patented Jan. 21, 1913.

Application filed May 15, 1911. Serial No. 627,256.

*To all whom it may concern:*

Be it known that I, WILSON E. SYMONS, a citizen of the United States, residing at Chicago, in the county of Cook and State of Illinois, have invented a new and useful Automobile-Fender, of which the following is a specification.

The invention relates to improvements in fenders.
The object of the present invention is to improve the construction of fenders, and to provide a simple and efficient automobile fender of light and comparatively inexpensive construction, adapted to be carried normally about the line of axle clearance, and capable, should an automobile come in contact with a person or other object, of automatically dropping and of preventing such person or object from beng run over by the automobile.

A further object of the invention is to provide a fender having a buffer adapted to cushion the blow when an automobile strikes a person or is struck, and connected with the fender and capable of automatically operating the same to drop the fender.

Another object of the invention is to provide operating mechanism adapted to enable the chauffeur or driver to drop the fender instantly, and capable of permitting him to readily elevate and re-set the fender after an operation thereof.

With these and other objects in view, the invention consists in the construction and novel combination of parts hereinafter fully described, illustrated in the accompanying drawings, and pointed out in the claims hereto appended; it being understood that various changes in the form, proportion, size and minor details of construction, within the scope of the claims, may be resorted to without departing from the spirit or sacrificing any of the advantages of the invention.
In the drawings:—Figure 1 is a side elevation of an automobile fender, constructed in accordance with this invention, and shown applied to an automobile, the front portion thereof being illustrated in dotted lines. Fig. 2 is a plan view of the same. Fig. 3 is a front elevation of the fender, a portion of the pneumatic buffer being broken away, and one of the supporting side bars being in section. Fig. 4 is a transverse sectional view on the line 4—4 of Fig. 2. Fig. 5 is an enlarged horizontal plan view partly in section of one side of the device. Fig. 6 is a vertical longitudinal sectional view on the line 6—6 of Fig. 5. Fig. 7 is a detail transverse sectional view on the line 7—7 of Fig.
5. Fig. 8 is a similar view on the line 8—8 of Fig. 5. Fig. 9 is a horizontal sectional view taken substantially on the line 9—9 of Fig. 3. Fig. 10 is a vertical sectional view of the check dropping mechanism. Fig. 11 is a detail sectional view, illustrating the manner of mounting the operating lever for manually tripping the fender.

Like numerals of reference designate corresponding parts in all the figures of the drawings.

In the accompanying drawings in which is illustrated the preferred embodiment of the invention, 1 designates the fender proper, constructed of suitable metal and consisting of an approximately V-shaped horizontally disposed bottom bar 2, a straight horizontal top bar 3 and vertical side bars 4, connecting the top and bottom bars. The top and bottom bars are also connected by central and side inclined rods 5 and 6. By this construction, the fender is tapered and inclined similarly to an ordinary cow-catcher. The bottom bar 2 is extended laterally beyond the side bars 4, and the fender is provided at opposite sides with vertical arms 7, extending upwardly from the terminal extensions of the bottom bar 2, and slidably arranged in vertical tubular guides 8 of a main supporting bracket 9. The slidable mounting of the fender 1 enables the latter to be raised and lowered, and it is normally supported in an elevated position approximately at the line of axle clearance of the automobile. The particular construction and manner of slidably mounting the fender 1 are not specifically claimed in the present application, as claims for this construction are presented in a companion application filed May 15, 1911, Serial No. 627,255, which also contains claims generic to the form of automobile fender shown and described in the said application and also illustrated and described in the present application. The main supporting bracket is composed of the said opposite vertical guides 8, a top transverse connecting bar 12 and horizontal longitudinal arms 13, extending rearwardly from the tubular guides 8 at a point intermediate of the ends thereof, and provided with integral inclined attaching portions 14, forming front spring supports and designed to be secured to the side beams of the frame of an automobile, whereby the main supporting bracket is rigidly mounted thereon. The main supporting bracket may be mounted on the automobile in any other desired manner. The guides 8 are provided adjacent to their lower ends with inwardly extending transversely disposed guiding arms 15, arranged horizontally and provided with recesses 16, which receive the vertical side rods 4 of the fender 1. These transverse inwardly projecting arms 15 support the top of the fender when the latter is dropped to its lower position, as clearly illustrated in Fig. 4 of the drawings, so that there is no liability of the upper portion of the fender yielding when subjected to a strain or jar incident to striking a person or other object.

The rearwardly extending side arms of the main supporting bracket are provided at their front portions with longitudinal openings 17 for the reception of reciprocatory side bars 18, projecting outwardly or forwardly in advance of the main supporting bracket and the fender and supporting a transversely disposed pneumatic buffer 19, extending entirely across the front of the automobile and having rearwardly curved terminal portions, extending to the planes of the wheels, as clearly illustrated in Fig. 2 of the drawings. The fender may also be extended entirely across the automobile to the plane of the wheels instead of being of a width corresponding to the width of the body of the automobile, as illustrated in the drawings. The pneumatic fender is preferably constructed, as shown and described in the aforesaid application, and is composed of inner and outer tubes 20 and 21, and is equipped with a suitable valve 22, adapted to be connected with a pump in the usual manner for inflating the pneumatic buffer. The front or outer ends of the side bars 18 are connected by hinges 23 and 24 with the metallic back 25 of the buffer, the hinge connections permitting either side of the buffer to be forced rearwardly without straining the connections at the opposite side of the buffer. The hinges 23 and 24 are provided with vertical pivots, and the leaf or hinge element 26 of the hinge 24 consists of a rectangular plate, slidably mounted in guides or ways 27 of a plate 28. The plate 28 is secured to the metallic back of the buffer, and the slidable connection between the buffer and the hinge 24 facilitates the independent operation of the side bars to drop the fender, as hereinafter fully explained. The buffer is also cushioned by coiled springs 29, disposed on the inner or rear portions of the side bars 18 and interposed between fixed eyes 30 and follower plates 31 and 32. The follower plates 31 and 32 are fitted snugly on reduced rear portions of the side rods or bars 18, and are held against shoulders 18$^a$ thereof by the coiled springs 29. When the side bars or rods are moved inwardly or rearwardly, the said shoulders 18$^a$ engage the follower plates and move the same inwardly or rearwardly. The eyes 30 consist of perforated lugs extending laterally from the inner or rear ends of the arms 13. The rear or inner ends of the coiled springs 29 bear against the eyes or lugs 30, and the follower plates, which bear against the front ends of the coiled springs, are engaged by shoulders 33 of the rods or bars 18. When the side bars 18 are moved inwardly or rearwardly by the buffer, the coiled springs 29 are compressed to cushion the buffer and also to return the parts to their initial position.

The vertically movable fender is provided at the inner sides of the vertical guide bars 4 with metallic loops or boxes 34, forming openings 35 for the reception or forwardly extending arms 36 and 37 of a transverse rock shaft 38, journaled in suitable bearings 39 mounted on the rearwardly extending arms 13 of the main supporting bracket. The arms 36 are provided at their front or outer ends with rounded approximately circular heads 40, which operate in the openings 35 of the metallic loops or boxes 34 of the fender. When the fender drops, it carries with it the arms 36 and 37, which swing downward from the position illustrated in full lines in Fig. 6 of the drawings to that shown in dotted lines in the said figure. The rock shaft 38 is also provided with a rear upwardly extending arm 41, preferably formed integral with the arm 36 at the right hand side of the device, the arms 36 and 41 constituting a bell crank lever, which is suitably fixed to the transverse rock shaft 38. The rear arm 41 is connected by a longitudinal rod 42 with a depending arm 43 of an operating lever 44, which is also in the form of a bell crank. The operating lever 44 is fulcrumed at its angle on a suitable pivot 45, and it has a forwardly extending arm 46, carrying a curved upwardly extending bar or portion 47. The bar or portion 47 extends upwardly and rearwardly from the outer end of the arm 46 into an arcuate tubular guide 48 which projects upwardly and rearwardly from a base plate 49 and preferably is formed integral with the same, and provided at one side with a longitudinal slot 50 in which operates the shank of a foot plate 51. The foot plate extends laterally from the arcuate bar or portion 47, and is adapted to be depressed by the foot of the chauffeur or driver to oscillate the operating lever 44 and partially rotate the rock shaft 38 for swinging the arms 36 and 37 upwardly to raise the fender. The fender drops by gravity assisted by springs 52, located at opposite sides of the automobile and consisting of coils arranged on the rock shaft 38, preferably around hub portions of the arms 36 and 37 and having terminal portions 53 and 54. The terminals 53 of the springs 52 are connected with the arms 36 and 37, and the other terminals 54 of the springs 52 are connected with fixed studs 55, projecting horizontally from the arms 13 at the inner sides thereof. The terminals 53 and 54 are bent to form hoops to engage the arms 36 and 37 and the said studs 55, as clearly illustrated in Fig. 6 of the drawings. The springs 52 and gravity cause the fender to drop instantly upon the same being released.

The fender is normally supported in an elevated position by a pair of catches or dogs 56, depending from a transverse rock shaft 57, which is journaled in suitable bearings 58 of the arms 13. The dogs or catches, which are provided at their upper ends with eyes to receive the rock shaft 57, are suitably fixed to the same, and they are provided at their lower portions with shoulders 59, located at the front edges of the dogs or catches and arranged to engage with lugs 60, formed integral with and projecting laterally from the outer side faces of the arms 36 and 37. The dogs or catches are urged forwardly and are maintained in engagement with the lugs 60 by springs 61, each consisting of a coil surrounding the rock shaft 57 and secured at one end 62 to the arm 13 and having its other end 63, engaging the rear edge of the catch or dog. The coils of the springs 61 may be supported by the bearings 58, or they may be mounted in any other desired manner. The lower ends of the catches or dogs are tapered, and they are adapted to engage with the lugs 60 automatically when the fender is raised. As soon as the lugs 60 are carried upward above the shoulders 59 of the catches or dogs, the latter will be moved forward beneath the said lugs 60. The downward movement of the fender may be limited by the operating mechinasm for raising the same, or the tubular guides may be slotted for the reception of pins or keys, as shown and described in the said companion application.

The follower plate 31 at the right hand side of the fender is extended downwardly and provided at its lower end with a laterally projecting stud 64, which extends through a longitudinal slot 65 of a link 66. The link 66 is provided at its front end with an eye 67, and is connected by a pin 68, or other suitable pivot to the lower end of the right hand catch or dog. The pin or pivot 68 pierces the dog, as clearly shown in Fig. 7 of the drawings, and the rear end of the link, which is slightly inclined, is provided with an opening 69 and is connected to the front end of a wire cord or cable 70, or other suitable flexible connection, which extends rearwardly to an operating lever 71 within reach of the chauffeur or driver to enable him to operate the dogs or catches by hand. When the buffer moves inwardly or rearwardly, it carries with it the side bars and the follower plate 31, and through the latter moves the link 66 inwardly or rearwardly and withdraws the catch from engagement with the lugs of the arms 36 and 37, thereby releasing or tripping the fender and permitting the same to instantly drop to its lowered position. The slot and stud connection between the link and the follower plate 31 permits the link 66 to be moved rearwardly and to be operated by hand independently of the buffer and the follower plate 31.

The flexible connection 70 passes under a guide pulley 72, and it is connected with the hand lever 71 at a point intermediate of the ends thereof. The hand lever is provided between its ends with an eye 73 to receive the rear end of the cord or cable, and it is mounted on the steering pillar of the automobile by means of a clamp composed of two sections 74 and 75. The clamp is of circular shape to conform to the configuration of the steering pillar, and the sections, which are approximately semi-circular, have extended terminals connected by bolts 76, or other suitable fastening devices. One of the sections of the clamp is extended to form a supporting arm 77, to which the hand lever 71 is pivoted by a bolt 78, or other suitable fastening device. The hand lever is bent outwardly adjacent to its pivot to off-set the body portion of the lever from the steering pillar, but the hand lever may be mounted in any other desired manner, and it is preferably supported by a stop 79. By locating the hand lever beneath the steering wheel 80, it is in convenient position to be instantly operated by the chauffeur or driver, as a light blow upon the lever from the underside will release the fender. This may be done in the fraction of a second, and a glove or gauntlet worn by the chauffeur or driver will not interfere with a quick operation of the hand lever.

The follower plate 31 is provided with an extended top portion 81, arranged in advance of and adapted to engage a trigger 82 of an alarm 83. The alarm 83, which may be of any preferred construction, is mounted upon the arm 13, and it is preferably equipped with a bell or gong and suitable mechanism operated by the trigger for tripping such mechanism for ringing the alarm, which may be constructed to operate continuously until stopped and re-set. The alarm will be sounded when the buffer is moved inwardly either through striking a person or other object, or through contact with an automobile or other vehicle. The alarm serves to warn the chauffeur of an accident, and if an automobile left standing at the sidewalk or other point should be struck by another automobile or vehicle, the alarm, which will be sounded, will notify or warn a person some distance from the scene of the accident.

The right hand reciprocatory side bar or rod 18 is provided at its rear end with a reduced extension 84, forming an inner transverse shoulder 85 and coöperating with a vertical receptacle 86 for ejecting a plurality of identification checks 87 therefrom. The receptacle, which is preferably cylindrical, is provided at a point between its ends with an attaching arm 88, secured by screws, or other suitable fastening devices to the upper face of the adjacent bracket arm 13 at the rear end thereof. The vertical receptacle is provided at its top with a removable screw cap 89, and a coiled spring 90 is interposed between the cap and the top of the column or series of identification checks for forcing down the latter within the receptacle. The identification checks are designed to bear the number of an automobile or other identifying matter, and when the side bar 18 is moved rearwardly, its rear check ejecting extension is carried under or through the lower end of the receptacle, thereby discharging a predetermined number of checks, so that in event of an accident positive and unmistakable evidence of an automobile will be left on the ground.

No claim is made in the present application to the check ejecting device or the alarm.

When the automobile strikes a person or other object, the buffer will be moved inwardly or rearwardly, which will drop the fender, operate the alarm and discharge the identification checks. The operating mechanism also enables the fender to be dropped by the chauffeur or driver before the automobile strikes a person or object, but if the chauffeur should be asleep, drunk, careless or reckless, the device will automatically perform the said functions of dropping the fender, sounding the alarm and discharging the identification checks.

The vertical tubular guides are provided at their upper ends with elastic caps 91, constructed as described and claimed in the said application and forming cushions to prevent a person being injured through contact with the upper ends of the vertical guides.

Having thus fully described my invention, what I claim as new and desire to secure by Letters Patent, is:—

1. A device of the class described including a fender slidable upwardly and downwardly, means for guiding the fender in its sliding movement, an oscillatory arm pivoted at one end and connected at the other end with the fender, a catch directly engageable with the arm at a point between its pivot and the fender for holding the latter in an elevated position, and means connected with the catch for tripping the same to permit the fender to drop.

2. A device of the class described including a fender slidable upwardly and downwardly, means for guiding the fender in its sliding movement, an oscillatory arm pivoted at one end and connected at the other end with the fender, a catch directly engageable with the arm at a point between its pivot and the fender for holding the latter in an elevated position, means connected with the catch for tripping the same to permit the fender to drop, and separate manually operable means connected with the arm for raising and setting the fender.

3. A device of the class described including a fender slidable upwardly and downwardly, means for guiding the fender in its sliding movement, an oscillatory arm connected with the fender, a catch for holding the arm to retain the fender in an elevated position, a movably mounted buffer, and means connecting the buffer with the catch for tripping the same when the buffer is moved inwardly.

4. A device of the class described including a fender slidable upwardly and downwardly, means for guiding the fender in its sliding movement, an oscillatory arm connected with the fender, a catch for holding the arm to retain the fender in an elevated position, means for tripping the catch for releasing the fender to permit the latter to drop, and a spring connected with the arm for actuating the same and the fender in the downward movement of the latter.

5. A device of the class described including a fender slidable upwardly and downwardly, means for guiding the fender in its sliding movement, an oscillatory arm connected with the fender, a catch for holding the arm to retain the fender in an elevated position, means for tripping the catch to release the fender and permit it to drop, and a spring consisting of a coil having one terminal connected with the said arm, and a stud mounted on a fixed portion of the device and receiving the other terminal of the spring.

6. A device of the class described including a fender slidable upwardly and downwardly, means for guiding the fender in its sliding movement, a catch, an oscillatory arm connected with the fender and provided with means for directly engaging the catch to support the fender in an elevated position, manually operable means connected with the catch for tripping the same to permit the fender to fall, and separate manually operable mechanism connected with the arm for raising the fender and for engaging the said arm with the catch.

7. A device of the class described including a fender slidable upwardly and downwardly, means for guiding the fender in its sliding movement, an oscillatory arm connected with the fender and provided with a projecting lug, a catch arranged to engage the lug for supporting the fender in an elevated position, and means connected with the catch for moving the same out of engagement with the lug to release the fender.

8. A device of the class described including a fender movable upwardly and downwardly, an oscillatory arm connected with the fender and provided with a projecting lug, a pivoted catch arranged in the path of the lug and adapted to engage the same automatically when the arm is swung upward, a spring connected with the catch for urging the same in the direction of the lug and for maintaining the catch in engagement with the same, and means for operating the catch to release the fender.

9. A device of the class described including a fender movable upwardly and downwardly, oscillatory arms connected with the fender, a shaft connecting the oscillatory arms, a rock shaft provided with catches arranged to engage the arms for holding the fender in an elevated position, and means for operating the rock shaft to release the fender.

10. A device of the class described including a fender movable upwardly and downwardly and provided at opposite sides with boxes or loops forming openings, oscillatory arms having rounded heads operating in the said openings, catches arranged to engage the arms for supporting the fender in an elevated position, and means for operating the catches to release the fender.

11. A device of the class described including a fender movable upwardly and downwardly, an oscillatory arm connected with the fender, a catch engaging the arm for supporting the fender in an elevated position, a buffer movable inwardly and outwardly, means for connecting the buffer with the catch for releasing the arm, and operating mechanism connected with the arm for oscillating the same to raise the fender.

12. A device of the class described including a fender movable upwardly and downwardly, a pivotally mounted bell crank located in rear of the fender and having one of its arms connected with the fender, and an operating lever connected with the other arm of the bell crank for raising the fender, means for holding the fender in an elevated position, and a buffer located in advance of the fender and connected with the holding means for tripping the fender.

13. A device of the class described including a fender movable upwardly and downwardly, a rock shaft having spaced forwardly extending oscillatory arms connected with the fender, said rock shaft being also provided with a rear arm, an operating lever, connections between the operating lever and the rear arm of the rock shaft, spaced catches arranged to engage the forwardly extending arms, and means for operating the catches to release the fender.

14. A device of the class described including a fender slidable upwardly and downwardly, means for guiding the fender in its sliding movement, a catch for holding the fender in an elevated position, a link connected with the catch, manually operable means located in the rear of the fender and connected with the link for actuating the same to operate the catch, a buffer located in advance of the fender, and means connecting the buffer with the link.

15. A device of the class described including a fender slidable upwardly and downwardly, means for guiding the fender in its sliding movement, a catch for holding the fender in an elevated position, a link connected with the catch, manually operable means located in rear of the fender and connected with the link for actuating the same to operate the catch, a buffer located in advance of the fender, and means connecting the buffer with the link, said means permitting an independent movement of the link when the latter is actuated by the manually operable means.

16. A device of the class described including a fender slidable upwardly and downwardly, means for guiding the fender in its sliding movement, a catch for holding the fender in an elevated position, manually operable means located in rear of the fender and connected with the catch for releasing the fender, a buffer located in advance of the fender, and means connecting the buffer with the catch for releasing the fender, the manually operable means being movable independently of the means connecting the buffer with the catch.

17. A device of the class described including a fender slidable upwardly and downwardly, means for guiding the fender in its sliding movement, a catch for holding the fender in an elevated position, a link connected with the catch, a buffer located in advance of the fender, a reciprocatory bar connected with the buffer, and means connecting the bar and the link.

18. A device of the class described including a fender slidable upwardly and downwardly, means for guiding the fender in its sliding movement, a catch for holding the fender in an elevated position, a link connected with the catch, a buffer located in advance of the fender, a reciprocatory bar connected with the buffer, and a follower mounted on the said bar and connected with the link.

19. A device of the class described including a fender movable upwardly and downwardly, a catch for holding the fender in an elevated position, a link connected with the catch, a reciprocatory bar connected with the buffer, a follower mounted on the said bar and connected with the link, the latter being movable independently of the follower, and manually operable means connected with the link.

20. A device of the class described including a fender movable upwardly and downwardly, a catch for supporting the fender in an elevated position, a buffer movable inwardly and outwardly, a reciprocatory bar connected with the buffer, a follower plate carried by the bar and having a projecting stud, a link connected with the catch and having a slot receiving the stud, and operating mechanism connected with the link.

21. A device of the class described including a fender movable upwardly and downwardly, an oscillatory arm connected with the fender, a catch engaging the arm for supporting the fender in an elevated position, a buffer, a reciprocatory bar connected with the buffer, a link connected with the catch, a follower mounted on the reciprocatory bar and having a slidable connection with the link to permit an independent operation of the latter, and operating mechanism connected with the link.

22. A device of the class described including a fender movable upwardly and downwardly, means for mounting the same on an automobile at the front thereof, a catch for supporting the fender in an elevated position, a clamp adapted to embrace and engage the steering pillar of an automobile, an operating lever pivotally mounted on the clamp, and a flexible connection extending from the lever and connected with the catch.

In testimony, that I claim the foregoing as my own, I have hereto affixed my signature in the presence of two witnesses.

WILSON E. SYMONS.

Witnesses:
ALFRED COWLES,
G. E. TEUTON.